United States Patent
Singh et al.

(10) Patent No.: US 12,537,853 B2
(45) Date of Patent: Jan. 27, 2026

(54) RETROSPECTIVE CAMPAIGN DETECTION, CATEGORIZATION, CLASSIFICATION, AND REMEDIATION

(71) Applicant: Cisco Technology, Inc., San Jose, CA (US)

(72) Inventors: Abhishek Singh, Morgan Hill, CA (US); Omid Mirzaei, Reston, VA (US)

(73) Assignee: Cisco Technology, Inc., San Jose, CA (US)

( * ) Notice: Subject to any disclaimer, the term of this patent is extended or adjusted under 35 U.S.C. 154(b) by 203 days.

(21) Appl. No.: 18/475,896

(22) Filed: Sep. 27, 2023

(65) Prior Publication Data

US 2025/0080577 A1    Mar. 6, 2025

Related U.S. Application Data

(60) Provisional application No. 63/535,534, filed on Aug. 30, 2023.

(51) Int. Cl.
*H04L 9/40*    (2022.01)

(52) U.S. Cl.
CPC ...... *H04L 63/1483* (2013.01); *H04L 63/1425* (2013.01)

(58) Field of Classification Search
USPC ......................................................... 726/22
See application file for complete search history.

(56) References Cited

U.S. PATENT DOCUMENTS

| | | | |
|---|---|---|---|
| 9,548,988 B1 | 1/2017 | Roundy et al. | |
| 10,581,910 B2* | 3/2020 | Sites | G06N 3/044 |
| 10,880,322 B1* | 12/2020 | Jakobsson | H04L 51/08 |
| 11,075,930 B1 | 7/2021 | Xavier et al. | |
| 2021/0136089 A1 | 5/2021 | Costea et al. | |
| 2021/0168161 A1* | 6/2021 | Dunn | H04L 51/212 |
| 2021/0336983 A1* | 10/2021 | Lee | H04L 63/0245 |
| 2022/0255961 A1 | 8/2022 | Reiser et al. | |
| 2023/0007042 A1 | 1/2023 | Haworth et al. | |
| 2023/0224327 A1* | 7/2023 | Haworth | H04L 63/1441 726/23 |
| 2023/0388343 A1* | 11/2023 | Irimie | G06N 3/044 |
| 2023/0403296 A1* | 12/2023 | Pickman | H04L 63/1441 |

* cited by examiner

*Primary Examiner* — Sakinah White Taylor
(74) *Attorney, Agent, or Firm* — Lee & Hayes, P.C.

(57) ABSTRACT

This disclosure describes techniques and mechanisms to retroactively identifying, classifying, categorizing, and/or remediating campaigns by an email threat defense system. The described techniques may perform a time-series analysis on record data associated with emails and identify campaigns that have bypassed threat detection mechanisms. The described techniques may extract and correlate features of the record data in order to label and determine whether a campaign is malicious. Where the email campaign is malicious, remedial action(s) can occur. Accordingly, the described techniques may remediate false negatives in a network and improve network security.

20 Claims, 5 Drawing Sheets

RETROSPECTIVE CAMPAIGN DETECTION, CATEGORIZATION, CLASSIFICATION, AND REMEDIATION

CROSS REFERENCE TO RELATED APPLICATIONS

This application claims priority to U.S. Provisional Patent Application No. 63/535,534, filed on Aug. 30, 2023, the entire contents of which are incorporated herein by reference.

TECHNICAL FIELD

The present disclosure relates generally to the field of computer networking, and more particularly to retroactively identifying, classifying, categorizing, and/or remediating campaigns by an email threat defense system.

BACKGROUND

A campaign is a coordinated email attack against one or many organizations. Threat actors can use campaigns to send malicious attachments, business email compromise (BEC), phishing uniform resource locators (URLs), SPAM, and/or SCAM emails. Additionally, it can be part of marketing emails. In the case of email threat defense (ETD) solutions, one false negative that may occur is the lack of detection of malicious campaigns. For example, customers may report malicious campaigns that were missed by an ETD solution and/or device. While some systems create virtual environments to interact with URLs and identify the malicious ones using machine learning algorithms, handling the increasing volume of URLs remains an ongoing challenge. Similarly, when it comes to identifying BEC and SCAM emails, machine-learning (ML) models can be effective, but with the emergence of large language models (LLM) like ChatGPT, malicious actors find it increasingly straightforward to generate diverse BEC and SCAM email variations that can evade existing ETD solutions.

The same applies to detecting malicious email attachments. While signature-based solutions are effective at detecting known malicious patterns, they fall short in detecting unknown patterns. Even the more advanced solutions that leverage machine learning to detect malicious attachments are still prone to false negatives for different reasons, including the difficulties of feature selection and feature engineering. Moreover, the utilization of machine-learning and deep learning models demands significant computational resources, necessitates regular model retraining, and entails substantial costs, making the scalability of ML solutions for large organizations a resource-intensive and expensive endeavor.

Furthermore, current methods for detecting malicious attachments and URLs within emails, with the ultimate goal of identifying BEC, SCAM, and phishing threats, often fail to account for the delivery mechanisms of these threats. Conventional approaches may primarily analyze email body content or rely on real-time identification using fuzzy hashing. However, the resource-intensive nature of data storage for each email and the potential for false positives associated with clustering and fuzzy hashing mechanisms pose security risks that malicious actors could exploit to infiltrate a network.

Accordingly, there is a need for a simplified and cost-effective way to retroactively identify, categorize, classify, and/or remediate email campaigns that have evaded existing mechanisms.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
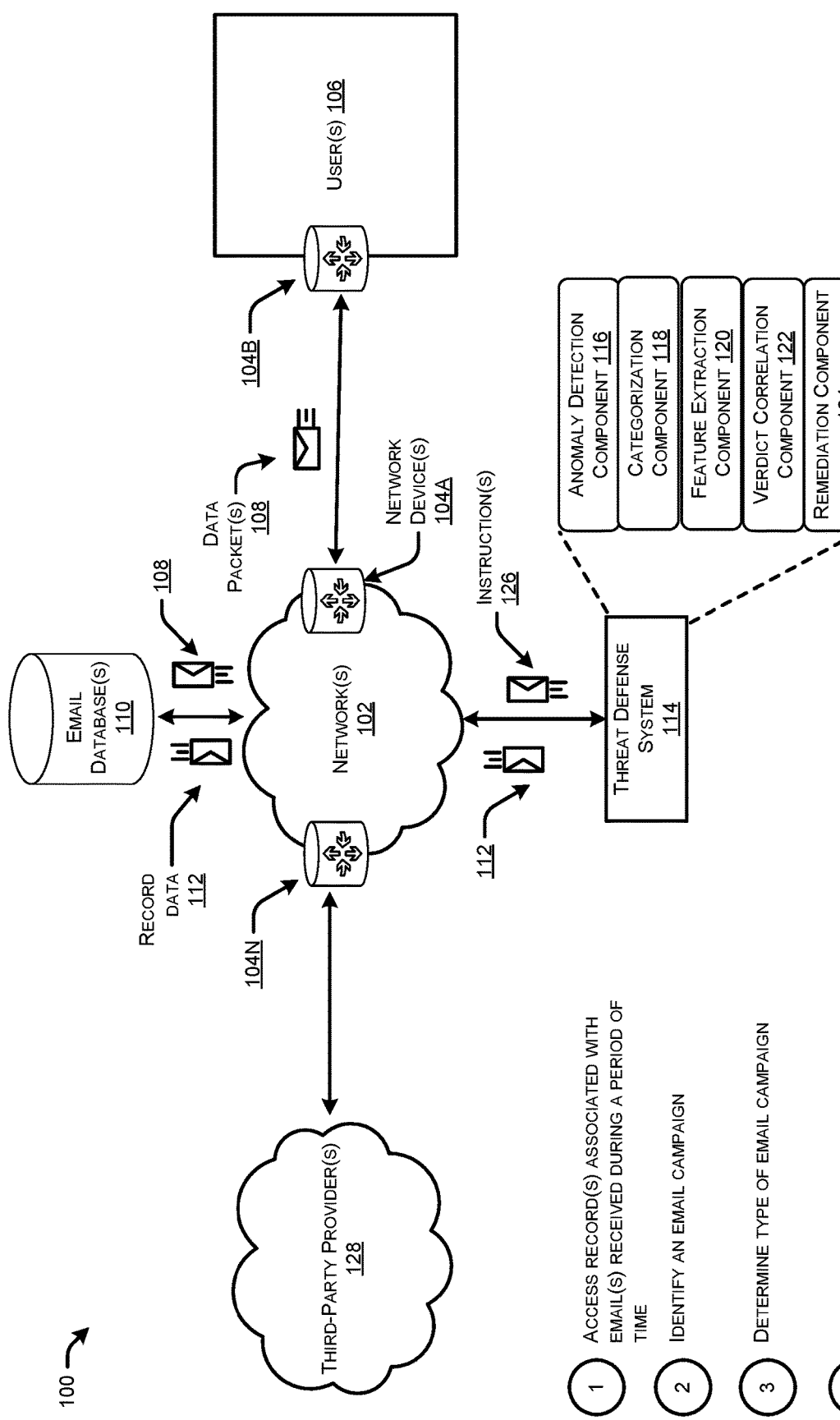
FIG. 1 illustrates an example environment for campaign identification, categorization, classification, and/or remediation by a threat defense (TD) system as described herein.

The present disclosure relates generally to the field of computer networking, and more particularly to retroactively identifying, classifying, categorizing, and/or remediating campaigns by an email threat defense system.

A method to perform the techniques described herein may be implemented by a network device of a network to perform retrospective campaign detection. The method may comprise accessing, based at least in part on connecting to a database associated with the network, record data associated with emails received during a period of time. The method may comprise identifying, based at least in part on the record data, a campaign associated with the emails. In some examples, the method may comprise determining a type of campaign associated with the email campaign. The method may further comprise determining, based at least in part on extracting metadata associated with the emails, that the email campaign is a malicious campaign. The method may comprise performing, based at least in part on the type of campaign, one or more remedial actions.

Additionally, any techniques described herein, may be performed by a system and/or device having non-transitory computer-readable media storing computer-executable instructions that, when executed by one or more processors, performs the method(s) described above and/or one or more non-transitory computer-readable media storing computer-readable instructions that, when executed by one or more processors, cause the one or more processors to perform the method(s) described herein.

Example Embodiments

A campaign is a coordinated email attack against one or many organizations. Threat actors can use campaigns to send malicious attachments, business email compromise (BEC), phishing uniform resource locators (URLs), and/or SCAM emails. Additionally, it can be part of marketing emails. In the case of email threat defense (ETD) solutions, one false negative that may occur is the lack of detection of malicious campaigns. For example, customers may report malicious campaigns that were missed by an ETD solution and/or device. While some systems create virtual environments to interact with URLs and identify the malicious ones using machine learning algorithms, handling the increasing volume of URLs remains an ongoing challenge. Similarly, when it comes to identifying BEC and SCAM emails, machine-learning (ML) models can be effective, but with the emergence of large language models (LLM) like ChatGPT, malicious actors find it increasingly straightforward to generate diverse BEC and SCAM email variations that can evade existing ETD solutions.

The same applies to detecting malicious email attachments. While signature-based solutions are effective at detecting known malicious patterns, they fall short in detecting unknown patterns. Even the more advanced solutions that leverage machine learning to detect malicious attachments are still prone to false negatives for different reasons, including the difficulties of feature selection and feature engineering. Moreover, the utilization of machine-learning and deep learning models demands significant computational resources, necessitates regular model retraining, and entails substantial costs, making the scalability of ML solutions for large organizations a resource-intensive and expensive endeavor.

Furthermore, current methods for detecting malicious attachments and URLs within emails, with the ultimate goal of identifying BEC, SCAM, and phishing threats, often fail to account for the delivery mechanisms of these threats. Conventional approaches may primarily analyze email body content or rely on real-time identification using fuzzy hashing. However, the resource-intensive nature of data storage for each email and the potential for false positives associated with clustering and fuzzy hashing mechanisms pose security risks that malicious actors could exploit to infiltrate a network.

Accordingly, there is a need for a simplified and cost-effective way to retroactively identify, categorize, classify, and/or remediate email campaigns that have evaded existing mechanisms.

This disclosure describes techniques for campaign detection, categorization, classification, and remediation by an email threat defense system. The system connects to an email database that stores a plurality of emails and associated data (e.g., metadata associated with each email, and historical data associated with each tenant In some examples, the system may access and/or retrieve record data of every email delivered to each tenant. In some examples, the record data may comprise metadata associated with the email, including metadata associated with URLs in an email, attachments (e.g., PDFs, GIFs, etc.) associated with the email, metadata associated with the subject of the email, metadata corresponding to the "FROM" email header, metadata corresponding to the "TO" email header, metadata comprising a timestamp associated with the email, and/or any other metadata associated with the email.

In some examples, the threat defense system may include an anomaly detection component. In some examples, the anomaly detection component may initiate accessing the email database. For instance, the anomaly detection component may connect to the email database in order to retrieve the record data associated with emails of tenants, such as emails that have been delivered to inboxes. In some examples, the anomaly detection component may, for each tenant, perform a time-series analysis on the metadata included in the record data that is associated with the sender of an email (e.g., such as a sender domain, sender name, etc.) and the subject of the email.

For example, the anomaly detection component may access the email database and retrieve record data associated with a tenant for a particular time period (e.g., past 180 days, past year, or any suitable time period). For instance, the anomaly detection component may retrieve record data associated with emails from the past 180 days. The anomaly detection component may utilize the timestamps associated with each of the emails and count the number of emails with similar subjects that were sent from each sender domain to each tenant in specific time intervals (e.g., 10 seconds, 20 seconds, and/or any suitable time interval). Similar subjects may be obtained via fuzzy string matching.

In some examples, the anomaly detection component may calculate a score (e.g., such as a z-score), to identify anomalies in the number of emails that have been sent to a destination domain (e.g., a tenant) at a more recent time by consulting the record data. For instance, the anomaly detection component may measure and/or determine the number of standard deviations the more recent counts of emails are away from email counts each tenant has received historically. In some examples, this measurement may be determined by utilizing the record data associated with each tenant.

In this way, the anomaly detection component may identify when large volumes of emails with identical subjects are being sent from a specific domain (or sender domain) to each tenant (or a destination domain). Accordingly, a campaign may be identified where there is a burst of emails to a specific tenant, where the email is sent from a rare sender and/or during a relatively short time period. That is, the anomaly detection component may retrospectively identify campaigns associated with a particular time period (e.g., such as the past 180 days) using the sender domain and data associated with the subject of the emails. Accordingly, by not requiring use of ML models and/or the body of the emails, the anomaly detection component requires fewer network and/or device resources and provides a streamlined way to retrospectively identify campaigns.

In some examples, threat defense system may include a categorization component. In some examples, the categorization component may extract the subject of each email identified as being part of the email campaign. In some examples, the categorization component may receive anomaly data as input. In some examples, the anomaly data comprises an indication of a subject of the record data associated with a campaign. In some examples, the categorization component may access the record data associated with a subset of the emails corresponding to the email campaign. In some examples, the categorization component may access all of the record data.

In some examples, the categorization component may compare data associated with each subject of an email in the email campaign with a precomputed dictionary of words in order to determine a category associated with the email campaign. In some examples, the category may comprise labeling the email campaign as BEC (e.g., sub-categories include payroll, initial lure, gift card, invoice, aging report, tax statement, wire transfer), Phishing, SCAM (e.g., sub-categories include advance fee, extortion, inheritance, investment, lottery, romance, etc.), and/or marketing campaigns.

For instance, the categorization component may extract data associated with the subjects from each of the emails. The categorization component may compare the subject data with the pre-stored labeled regular expressions. In case of a match, the categorization component may assign a label to the email campaign. For instance, the email campaign may get assigned a label such as BEC, Phishing, marketing, SCAM, and/or SPAM emails. In some examples, the pre-stored regular expressions may be computed by combining the words extracted from the subject using a natural language tool kit (NLTK) and/or document modeling techniques against a set of BEC, phishing, marketing, SCAM, and SPAM emails.

In some examples, the categorization component may utilize statistical models to determine whether there is a match between a subject and a pre-stored label. For instance, the categorization component may apply fuzzy hashing to the subjects of emails in the subset of email(s) (e.g., email(s) from the last 90 days, 180 days, etc.) associated with a particular tenant in order to identify email(s) that share identical subjects and/or are from the same sender address and/or sender domain. In some examples, the categorization component may input the subject of an email into a statistical model and the statistical model may output a topic and key words (e.g., fax, delivery, invoice, call for action, and/or other context key words) based on the subject.

In some examples, the threat defense system may include a feature extraction component. In some examples, the feature extraction component may be configured to access one or more public database(s), public site(s), and/or public libraries. In some examples, the feature extraction component may receive the record data, the categorization data from the categorization component and/or the anomaly data from the anomaly detection component as input.

In some examples, the feature extraction component may extract a sender domain, a certificate, and/or any URLs found within the emails associated with the record data. In some examples, the feature extraction component may access a public URL domain registration database (e.g., the WHOIS records) in order to determine whether a sender domain is suspicious (e.g., potentially malicious). In some examples, the WHOIS record data may comprise a creation date associated with a sender domain, an expiration date associated with the sender domain, an indication of whether the sender domain is registered or not, whether information is missing in the record, existence of privacy protection services, administrator country information, etc.

In some examples, the feature extraction component may utilize the WHOIS record of a sender domain to determine whether a URL is suspicious. Conditions that are used to determine a URL associated with a sender domain is suspicious may include, but are not limited to: (1) a creation time in less than six months; (2) no WHOIS or name server; (3) WHOIS domain is going to expire in less than a year; (4) the existence of missing information in the WHOIS record; (5) the existence of suspicious information in the WHOIS record (e.g., the administrator country, etc.); and/or (6) the existence of privacy protection services.

In some examples, the feature extraction component may extract a certificate of a URL and/or a certificate of a domain in order to determine if the URL and/or the domain is suspicious. For example, the certificate of the URL may correspond to the SSL. Suspicious conditions may include, but are not limited to: (1) a server does not support hypertext transfer protocol (HTTP); (2) a HOST name does not match the certificate; (3) the certificate is expired; (4) the expiry time of the certificate is in less than six months; and/or (5) the certificate is signed by a certificate authority mainly used in malicious domains (e.g., cPanel, Let's Encrypt, etc.). In some examples, the feature extraction component is configured to input the URL into a URL tester website. In this example, the URL tester may output an indication of whether the URL is suspicious (e.g., malicious, phishing, etc.).

In some examples, the feature extraction component may be configured to consult with domain ranking systems such as Alexa rank (or any other global ranking system that ranks websites in order of popularity) to determine if the domain name of any URLs found in the emails of a campaign are among the top "X" number of domains (e.g., top 1 million domains or any suitable number).

In some examples, the threat defense system may include a verdict correlation component. In some examples, the verdict correlation component may correspond to a verdict correlation engine. In some examples, the verdict correlation component may receive input from one or more of the anomaly detection component, categorization component, and/or feature extraction component. In some examples, the verdict correlation component may provide output(s) to one or more of the anomaly detection component, the categorization component, feature extraction component, and/or remediation component. For example, the verdict correlation component may receive data as input from the anomaly detection component, the data comprising an email address of a sender and a sender domain for each email accessed by the anomaly detection component. In this example, the verdict correlation component may determine whether the sender is a rare sender (e.g., a sender email address that has not contacted a tenant previously or very rarely contacts the tenant) and/or whether the sender domain is a rare domain (e.g., a sender domain that has not contacted a tenant previously or very rarely contacts the tenant), by correlating the data with additional data corresponding to every sender's email address and every sender domain for a particular tenant for the past 90 days (or any other suitable time period). In some examples, the verdict correlation component may output an indication to the anomaly detection component, where the indication identifies whether the sender's email address is a rare email address and/or or the sender domain is a rare domain for the tenant. As described above, the anomaly detection component may utilize this indication when identifying a campaign.

In some examples, the verdict correlation engine may store and/or utilize input received from the anomaly detection component, categorization component, and/or feature extraction component as rules. In some examples, the verdict correlation component may store pre-set rules. For example, the verdict correlation component may receive features (e.g., categorization data, classification data, and/or any other data and/or metadata described herein) as input and, based on the rules, determine whether the email campaign is malicious or not. In some examples, the output is sent to the remediation component.

In some examples, the verdict correlation component may utilize one or more machine learning model(s) such as decision trees and/or any other deep learning architectures in order to determine whether a campaign is malicious. For example, the verdict correlation component may receive features (e.g., categorization data, classification data, and/or any other data and/or metadata described herein) as input and, utilizing the ML model(s), output an indication of whether the email campaign is malicious or not. In some examples, the output is sent to the remediation component.

In some examples, the threat defense system may include a remediation component. In some examples, the remediation component may be configured to perform one or more remedial actions on a campaign. In some examples, the one or more remedial action may comprise pulling one or more emails associated with a campaign from inboxes of tenant(s), providing an alert to an administrator of a user (e.g., organization), causing an email associated with a campaign to be highlighted in the mailbox of a tenant, performing no action, etc. In some examples, the remediation component may perform the remedial actions automatically and without administrator input. In some examples, the remediation component may be configured to alert an administrator and perform the remedial action(s) in response to a selection and/or administrator input.

In some examples, the remediation component may determine the remedial action based on the category of the email campaign (e.g., label assigned to the email campaign by the categorization component). For instance, where a campaign is labeled Phishing (e.g., the emails in the email campaign comprise a phishing link) and the threat defense system has determined the email campaign is malicious, the remediation component may be configured to pull (e.g., remove) all emails associated with the email campaign from the inboxes of tenants of the user.

In some examples, the remediation component may perform a remedial action based on maintaining an allow list and/or a block list. In this example, a user may input a list of sender domains that tenants are permitted to receive emails from on an allow list. The user may also input a list of sender domains that the tenants are not permitted to receive emails from. In this example, where the remediation component determines a sender domain is malicious and is not included on the allow list, the remediation component may update the block list to include the newly identified sender domain. In some examples, the remediation component may be configured to contact additional features of the network system. For instance, the remediation component may be configured to send any indications of Phishing campaigns, BEC campaigns, and/or any malicious campaign to a network extended detection response (e.g., such as Cisco XDR) in order to improve network security.

In this way, the threat defense system may retroactively identify campaigns that have bypassed existing threat detection mechanism, thereby remediating false negatives and improving network security. Moreover, by focusing on emails that have bypassed existing detection mechanisms, the current techniques utilize data associated with a subset of emails, thereby using less resources than existing mechanisms and improving overall function of the network. Further, by utilizing a time-series analysis (e.g., versus fuzzy hashing and/or ML models) and the subjects of emails (e.g., versus the bodies of the email, etc.), the described techniques require less storage and/or computing resources than existing mechanisms, thereby improving network device functioning, and providing a system that is scalable for a large network.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of a system 100 for campaign detection, categorization, classification, and/or remediation by a threat defense (TD) system 114. In some examples, the threat defense system 114 corresponds to an email threat defense system. While the system 100 shows an example threat defense system 114, it is understood that any of the components of the system may be implemented on any device in the network 102.

In some examples, the system 100 may include a network 102 that includes network devices 104. The network 102 may include one or more networks implemented by any viable communication technology, such as wired and/or wireless modalities and/or technologies. The network 102 may include any combination of Personal Area Networks (PANs), software defined cloud interconnects (SDCI), Local Area Networks (LANs), Campus Area Networks (CANs), Metropolitan Area Networks (MANs), extranets, intranets, the Internet, short-range wireless communication networks (e.g., ZigBee, Bluetooth, etc.), Wide Area Networks (WANs)—both centralized and/or distributed, software defined WANs (SDWANs)—and/or any combination, permutation, and/or aggregation thereof. The network 102 may include devices, virtual resources, or other nodes that relay packets from one network segment to another by nodes in the computer network. The network 102 may include multiple devices that utilize the network layer (and/or session layer, transport layer, etc.) in the OSI model for packet forwarding, and/or other layers.

The system 100 may comprise a threat defense system 114. In some examples, the threat defense system 114 corresponds to a system that has complete visibility into the security fabric of a given network (e.g., enterprise network, smaller network, etc. In some examples, the threat defense system 114 may comprise a memory, one or more processors, etc., In some examples, the threat defense system 114 may comprise a controller. In some examples, the threat defense system 114 may be integrated as part of Cisco's XDR feature and/or Cisco's Email Threat Defense feature.

The threat defense system 114 may be configured to communicate with one or more network device(s) 104. For instance, the threat defense system 114 may receive network data (e.g., network traffic load data, network client data, etc.) or other data (e.g., application load data, data associated with WLCs, APs, etc.) from the network device(s) 104. The network device(s) 104 may comprise routers, switches, access points, stations, radios, and/or any other network device. In some examples, the network device(s) 104 may monitor traffic flow(s) within the network and may report information associated with the traffic flow(s) to the threat defense system 114.

In some examples, the threat defense system 114 may include an anomaly detection component 116. In some examples, the anomaly detection component 116 may initiate accessing the email database(s) 110 of the user. For instance, the anomaly detection component 116 may connect to the email database 110 in order to retrieve the record data 112 associated with emails of tenants, such as emails that have been delivered to inboxes of tenants of the user 106. In some examples, the record data may comprise metadata associated with the email, including metadata associated with URLs in an email, attachments (e.g., PDFs, GIFs, etc.) associated with the email, metadata associated with the subject of the email, metadata corresponding to the "FROM" email header, metadata corresponding to the "TO" email header, metadata comprising a timestamp associated with the email, and/or any other metadata associated with the email. In some examples, the anomaly detection component 116 may, for each tenant, perform a time-series analysis on the metadata included in the record data 112 that is associated with the sender of an email (e.g., such as a sender domain, sender name, etc.) and the subject of the email.

For example, the anomaly detection component 116 may access and/or connect the email database 110 and retrieve record data 112 associated with tenants of a user 106 for a particular time period (e.g., past 180 days, past year, or any suitable time period). For instance, the anomaly detection component 116 may retrieve record data 112 associated with emails from the past 180 days. The anomaly detection component 116 may utilize the timestamps associated with each of the emails and/or count the number of emails with similar subjects that were sent from each sender domain to each tenant in specific time intervals (e.g., 10 seconds, 20 seconds, and/or any suitable time interval). Similar subjects may be obtained via fuzzy string matching.

In some examples, the anomaly detection component 116 may calculate a score (e.g., such as a z-score), to identify anomalies in the number of emails that have been sent to a destination domain (e.g., a tenant) at a more recent time by consulting the record data. For instance, the anomaly detection component 116 may measure and/or determine the number of standard deviations the more recent counts of emails are away from email counts each tenant has received historically. In some examples, this measurement may be determined by utilizing the record data associated with each tenant.

In this way, the anomaly detection component 116 may identify when large volumes of emails with identical subjects are being sent from a specific domain (or sender domains) to each tenant (or a destination domain). Accordingly, a campaign may be identified where there is a burst of emails to tenants of the user, where the email is sent from a rare sender and/or during a short time period. That is, the anomaly detection component 116 may retrospectively identify campaigns associated with a particular time period (e.g., such as the past 180 days) using the sender domain and data associated with the subject of the emails. Accordingly, by not requiring use of ML models and/or the body of the emails, the anomaly detection component 116 requires fewer network and/or device resources and provides a streamlined way to retrospectively identify campaigns.

In some examples, threat defense system 114 may include a categorization component 118. In some examples, the categorization component 118 may extract the subject of each email identified as being part of the email campaign. In some examples, the categorization component 118 may receive anomaly data as input. In some examples, the anomaly data comprises an indication of a subject of the record data associated with a campaign.

In some examples, the categorization component 118 may compare data associated with each subject of an email in the email campaign with a pre-computed dictionary of words in order to determine a category associated with the email campaign. In some examples, the category may comprise labeling the email campaign as BEC (e.g., sub-categories include payroll, initial lure, gift card, invoice, aging report, tax statement, wire transfer), phishing, SPAM, SCAM (e.g., sub-categories include advance fee, extortion, inheritance, investment, lottery, romance, etc.), and/or marketing campaigns.

For instance, the categorization component 118 may extract data associated with the subjects from each of the emails. The categorization component 118 may compare the subject data with the pre-stored labeled regular expressions. In case of a match, the categorization component 118 may assign a label to the email campaign. For instance, the email campaign may get assigned a label such as BEC, Phishing, marketing, SCAM, and/or SPAM emails. In some examples, the pre-stored regular expressions may be computed by combining the words extracted from the subject using NLTK and/or document modeling techniques against a set of BEC, Phishing, marketing, and SPAM emails. In some examples, In some examples, the pre-stored labeled regular expressions may correspond to regular expressions used by malicious actors. In some examples, the one or more pre-stored regular expressions may be generated using a topic modeling NLP algorithm.

In some examples, the categorization component 118 may utilize statistical models to determine whether there is a match between a subject and a pre-stored label. For instance, the categorization component 118 may apply fuzzy hashing to the subjects of emails in the subset of email(s) (e.g., email(s) from the last 90 days, 180 days, etc.) associated with a particular tenant in order to identify email(s) that share identical subjects and/or are from the same sender address and/or sender domain. In some examples, the categorization component 118 may input the subject of an email into a statistical model and the statistical model may output a topic and key words (e.g., fax, delivery, invoice, call for action, and/or other context key words) based on the subject.

In some examples, the threat defense system 114 may include a feature extraction component 120. In some examples, the feature extraction component 120 may be configured to access one or more public database(s), public site(s), and/or public libraries. In some examples, the feature extraction component 120 may receive the record data, the categorization data from the categorization component and/or the anomaly data from the anomaly detection component as input.

In some examples, the feature extraction component 120 may extract a sender domain, a certificate, and/or any URLs found within the emails associated with the record data. In some examples, the feature extraction component 120 may access a public URL domain registration database (e.g., such as WHOIS) in order to determine whether a sender domain is suspicious (e.g., potentially malicious). In some examples, the feature extraction component 120 may input a sender domain into WHOIS and receive WHOIS record data in return. In some examples, the WHOIS record data may comprise a creation time associated with a sender domain, an expiration date associated with the sender domain, an indication of whether the sender domain is registered or not, whether information is missing in the WHOIS registration record, existence of privacy protection services, administrator country information, etc.

In some examples, the feature extraction component 120 may utilize the WHOIS record of a sender domain to determine whether a URL is suspicious. Conditions that are used to determine a URL associated with a sender domain is suspicious may include, but are not limited to: (1) a creation time in less than six months; (2) no WHOIS or name server; (3) WHOIS domain is going to expire in less than a year; (4) the existence of missing information in the WHOIS record; (5) the existence of suspicious information in the WHOIS record (e.g., the administrator country, etc.); and/or (6) the existence of privacy protection services.

In some examples, the feature extraction component 120 may extract a certificate of a URL and/or a certificate of a domain in order to determine if the URL and/or the domain is suspicious. For example, the certificate of the URL may correspond to the SSL. Suspicious conditions may include, but are not limited to: (1) a server does not support hypertext transfer protocol (HTTP); (2) a HOST name does not match the certificate; (3) the certificate is expired; (4) the expiry time of the certificate is in less than six months; and/or (5) the certificate is signed by a certificate authority mainly used in malicious domains (e.g., cPanel, Let's Encrypt, etc.). In some examples, the feature extraction component 120 is configured to input the URL into a URL tester website. In this example, the URL tester may output an indication of whether the URL is suspicious (e.g., malicious, phishing, etc.).

In some examples, the feature extraction component 120 may be configured to consult with domain ranking systems, such as, for example, Alexa rank (or any other global ranking system that ranks websites in order of popularity) to determine if the domain name of any URLs found in the emails of a campaign are among the top "X" number of domains (e.g., top 1 million domains or any suitable number).

In some examples, the threat defense system 114 may include a verdict correlation component 122. In some examples, the verdict correlation component 122 may correspond to a verdict correlation engine. In some examples, the verdict correlation component 122 may receive input from one or more of the anomaly detection component, categorization component, and/or feature extraction component. In some examples, the verdict correlation component 122 may provide output(s) to one or more of the anomaly detection component, the categorization component, feature extraction component, and/or remediation component. For example, the verdict correlation component 122 may receive data as input from the anomaly detection component, the data comprising an email address of a sender and a sender domain for each email accessed by the anomaly detection component. In this example, the verdict correlation component 122 may determine whether the sender is a rare sender (e.g., a sender email address that has not contacted a tenant previously or very rarely contacts the tenant) and/or whether the sender domain is a rare domain (e.g., a sender domain that has not contacted a tenant previously or very rarely contacts the tenant), by correlating the data with additional data corresponding to every sender's email address and every sender domain for a particular tenant for the past 90 days (or any other suitable time period). In some examples, the verdict correlation component 122 may output an indication to the anomaly detection component, where the indication identifies whether the sender's email address is a rare email address and/or or the sender domain is a rare domain for the tenant. As described above, the anomaly detection component may utilize this indication when identifying a campaign.

In some examples, the verdict correlation engine may store and/or utilize input received from the anomaly detection component, categorization component, and/or feature extraction component as rules. In some examples, the verdict correlation component may store pre-set rules. For example, the verdict correlation component 122 may receive features (e.g., categorization data, classification data, and/or any other data and/or metadata described herein) as input and, based on the rules, determine whether the email campaign is malicious or not. In some examples, the output is sent to the remediation component.

In some examples, the verdict correlation component 122 may utilize one or more machine learning model(s), decision trees and/or any other deep learning architectures in order to determine whether a campaign is malicious. For example, the verdict correlation component 122 may receive features (e.g., categorization data, classification data, and/or any other data and/or metadata described herein) as input and, utilizing the ML model(s), output an indication of whether the email campaign is malicious or not. In some examples, the output is sent to the remediation component 124.

In some examples, the threat defense system 114 may include a remediation component 124. In some examples, the remediation component 124 may be configured to perform one or more remedial actions on a campaign. In some examples, the one or more remedial actions may comprise pulling one or more emails associated with a campaign from inboxes of tenant(s), providing an alert to an administrator of a user (e.g., organization), causing an email associated with a campaign to be highlighted in the mailbox of a tenant, performing no action, etc. In some examples, the remediation component 124 may perform the remedial actions automatically and without administrator input. In some examples, the remediation component 124 may be configured to alert an administrator and perform the remedial action(s) in response to a selection and/or administrator input.

In some examples, the remediation component 124 may determine the remedial action based on the category of the email campaign (e.g., label assigned to the email campaign by the categorization component). For instance, where a campaign is labeled Phishing (e.g., the emails in the email campaign comprise a phishing link) and the threat defense system has determined the email campaign is malicious, the remediation component 124 may be configured to pull (e.g., remove) all emails associated with the email campaign from the inboxes of tenants of the user. For instance, the remediation component may pull the emails from the email database(s) 110.

In some examples, the remediation component 124 may perform a remedial action based on maintaining an allow list and/or a block list. In this example, a user may input a list of sender domains that tenants are permitted to receive emails from on an allow list. The user may also input a list of sender domains that the tenants are not permitted to receive emails from. In this example, where the remediation component 124 determines a sender domain is malicious and is not included on the allow list, the remediation component 124 may update the block list to include the newly identified sender domain. In some examples, the remediation component 124 may be configured to contact additional features of the network system. For instance, the remediation component may be configured to send any indications of Phishing campaigns, BEC campaigns, and/or any malicious campaign to a network extended detection response (e.g., such as Cisco XDR) in order to improve network security.

In some examples, the system comprises user(s) 106. In some examples, the user(s) 106 may correspond to one or more branch(es), mobile device(s), and/or Internet of Things (IoT) device(s) located at one or more locations. In some examples, the user(s) 106 may comprise one or more network device(s) 104, gateway device(s) (also referred to herein as "gateways"), tunneling interfaces, etc. In some examples, the user(s) 106 may correspond to one or more organization(s) (e.g., businesses, schools, or any other organization) that comprise one or more tenant(s) (e.g., such as employee(s) of the organization, customer(s) of the organization, etc.). In some examples, tenant(s) of the user(s) 106 may utilize the network 102 for various service(s) (e.g., email services, security services, etc.). For instance, user(s) 106 may communication data packet(s) 108 via the network 102, where the data packet(s) 108 may be stored in database(s) 110. In some examples, the data packet(s) 108 may comprise data associated with email(s) sent by tenants of the user(s) 106 (e.g., such as employees of a user 106).

In some examples, the network device(s) 104 may communicate information. For instance, the network device(s) 104 may send data packet(s) 108 associated with data flows to other network device(s). In some examples, the data packet(s) 108 and/or metadata associated with the data packet(s) 108 may be sent to and/or stored in database(s) 110. In some examples, the data packet(s) 108 may be sent to and/or monitored by the threat defense system 114.

In some examples, the threat defense system 114 may be configured to access data from one or more third-party provider(s) 128. In some examples, the one or more third-party provider(s) 128 correspond to one or more public database(s), public site(s), etc. For instance, the third-party provider(s) 128 may correspond to Whois.com, ICANN, URL tester site(s), any site that provides an Alexa domain ranking, or any other suitable site and/or network defense tool.

At "1", the system may access record(s) associated with email(s) received during a period of time. For instance, the system may access a set of email(s) from an email database 110 of a user corresponding to a past time period (e.g., past 180 days). In some examples, the system may connect to an email database 110 and access and/or retrieve record data of every email delivered to each tenant of the user 106. In some examples, the record data may comprise metadata associated with the email, including metadata associated with URLs in an email, attachments (e.g., PDFs, GIFs, etc.) associated with the email, metadata associated with the subject of the email, metadata corresponding to the "FROM" email header, metadata corresponding to the "TO" email header, metadata comprising a timestamp associated with the email, and/or any other metadata associated with the email.

At "2", the system may identify an email campaign. In some examples, the system may identify the email campaign retroactively. In some examples, the system may utilize time-series analysis to identify a subset of the emails that correspond to an email campaign. For instance, the system may identify an email campaign using the anomaly detection component 116.

At "3", the system may determine a type of email campaign. For instance, the system may determine an email campaign is associated with a BEC campaign (e.g., sub-categories include payroll, initial lure, gift card, invoice, aging report, tax statement, wire transfer), SCAM campaign (e.g., sub-categories include advance fee, extortion, inheritance, investment, lottery, romance, etc.), Phishing campaign, marketing campaign, benign campaign, SPAM, etc. In some examples, the system may determine the type of campaign using the categorization component 118.

At "4", the system may determine whether the email campaign is malicious. For instance, the system may determine whether the email campaign is malicious based on features extracted by the feature extraction component, output from the categorization component, and/or output from the anomaly detection component. In some examples, the system may determine an email campaign is malicious using the verdict correlation component 122.

At "5", the system may perform remedial action(s). For instance, the system may perform remedial action(s) using the remediation component 124.

In this way, the system may retroactively identify email campaigns that have bypassed existing threat detection mechanism, thereby remediating false negatives and improving network security. Moreover, by focusing on emails that have bypassed existing detection mechanisms, the current techniques utilize data associated with a subset of emails, thereby using less resources than existing mechanisms and improving overall function of the network. Further, by utilizing a time-series analysis (e.g., versus fuzzy hashing and/or ML models) and the subjects of emails (e.g., versus the bodies of the email, etc.), the described techniques require less storage and/or computing resources than existing mechanisms, thereby improving network device functioning, and providing a system that is scalable for a large network.

Figure 2:
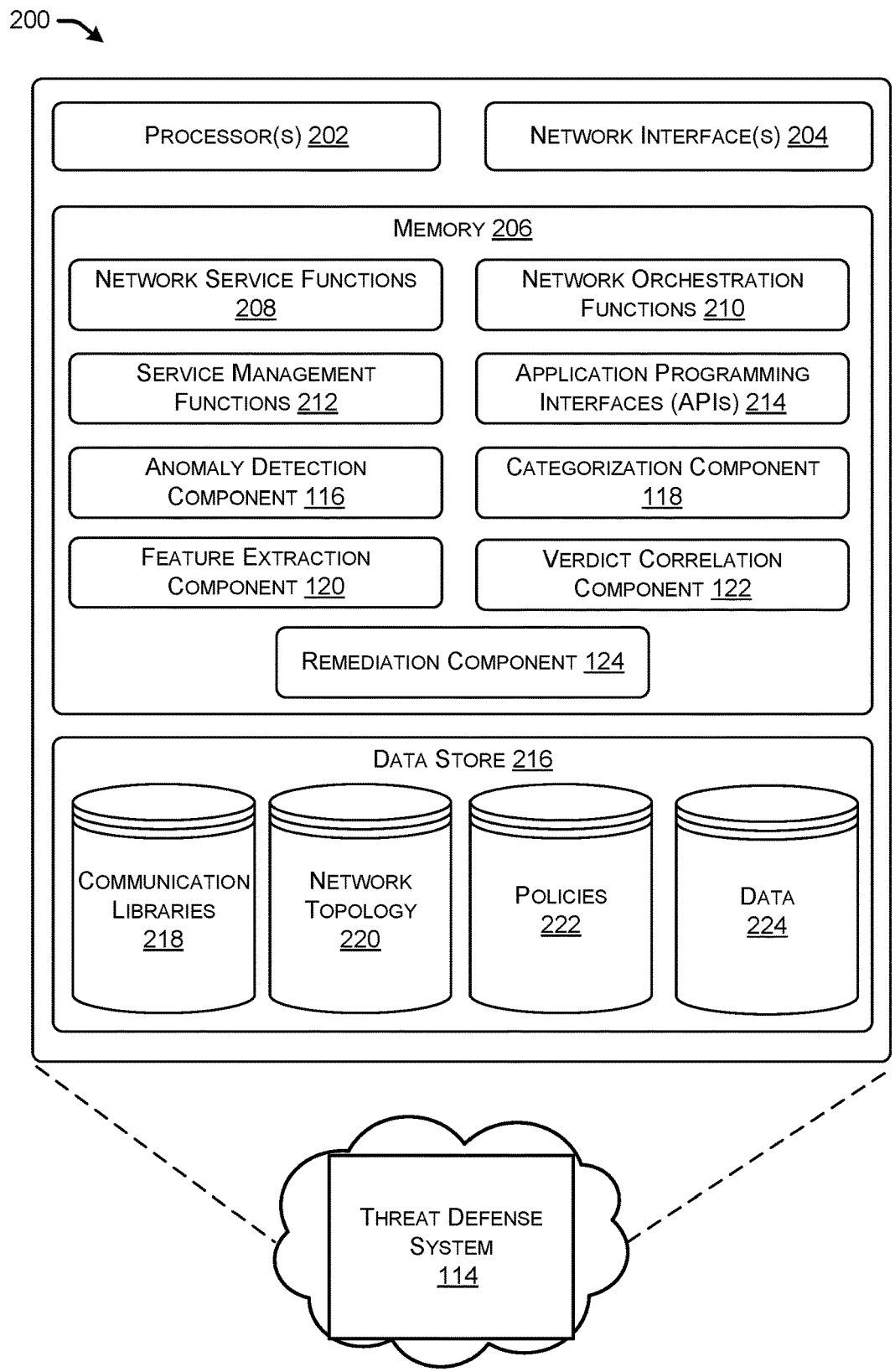
FIG. 2 illustrates a component diagram of an example threat defense system described in FIG. 1.

FIG. 2 illustrates a component diagram of an example monitoring system described in FIG. 1. In some instances, the threat defense system 114 may run on one or more computing devices in, or associated with, the network 102 (e.g., a single device or a system of devices). In some instances, the threat defense system 114 may be integrated as part of a cloud-based security solution (e.g., such as Cisco's Secure Email Threat Defense feature and/or Cisco's XDR feature).

Generally, the threat defense system 114 may include a programmable controller that manages some or all of the control plane activities of the network 102, and manages or monitors the network state using one or more centralized control models.

As illustrated, the threat defense system 114 may include, or run on, one or more hardware processors 202 (processors), one or more devices, configured to execute one or more stored instructions. The processor(s) 202 may comprise one or more cores. Further, the threat defense system 114 may include or be associated with (e.g., communicatively coupled to) one or more network interfaces 204 configured to provide communications with network device(s) 104, and other devices, and/or other systems or devices in the network 102 and/or remote from the network 102. The network interfaces 204 may include devices configured to couple to personal area networks (PANs), wired and wireless local area networks (LANs), wired and wireless wide area networks (WANs), SDWANs, SDCI's, and so forth. For example, the network interfaces 204 may include devices compatible with any networking protocol.

The threat defense system 114 may also include memory 206, such as computer-readable media, that stores various executable components (e.g., software-based components, firmware-based components, etc.). The memory 206 may generally store components to implement functionality described herein as being performed by the threat defense system 114. The memory 206 may store one or more network service functions 208, a topology manager to manage a topology of the network 102, a host tracker to track what network components are hosting which programs or software, a switch manager to manage switches of the network 102, a process manager, and/or any other type of function performed by the threat defense system 114.

The threat defense system 114 may further include network orchestration functions 210 stored in memory 206 that perform various network functions, such as resource management, creating and managing network overlays, programmable APIs, provisioning or deploying applications, software, or code to hosts, and/or perform any other orchestration functions. Further, the memory 206 may store one or more service management functions 212 configured to manage the specific services of the network 102 (configurable), and one or more APIs 214 for communicating with devices in the network 102 and causing various control plane functions to occur.

Further, the threat defense system 114 may include an anomaly detection component 116. In some examples, the anomaly detection component 116 may initiate accessing the email database(s) 110 of the user. For instance, the anomaly detection component 116 may connect to the email database 110 in order to retrieve the record data 112 associated with emails of tenants, such as emails that have been delivered to inboxes of tenants of the user 106. In some examples, the record data may comprise metadata associated with the email, including metadata associated with URLs in an email, attachments (e.g., PDFs, GIFs, etc.) associated with the email, metadata associated with the subject of the email, metadata corresponding to the "FROM" email header, metadata corresponding to the "TO" email header, metadata comprising a timestamp associated with the email, and/or any other metadata associated with the email. In some examples, the anomaly detection component 116 may, for each tenant, perform a time-series analysis on the metadata included in the record data 112 that is associated with the sender of an email (e.g., such as a sender domain, sender name, etc.) and the subject of the email.

For instance, the anomaly detection component 116 may retrieve record data 112 associated with emails from the past 180 days. The anomaly detection component 116 may utilize the timestamps associated with each of the emails and/or count the number of emails with similar subjects that were sent from each sender domain to each tenant in specific time intervals (e.g., 10 seconds, 20 seconds, and/or any suitable time interval). Similar subjects may be obtained via fuzzy string matching.

In some examples, the anomaly detection component 116 may calculate a score (e.g., such as a z-score), to identify anomalies in the number of emails that have been sent to a destination domain (e.g., a tenant) at a more recent time by consulting the record data. For instance, the anomaly detection component 116 may measure and/or determine the number of standard deviations the more recent counts of emails are away from email counts each tenant has received historically. In some examples, this measurement may be determined by utilizing the record data associated with each tenant.

In this way, the anomaly detection component 116 may identify when large volumes of emails with identical subjects are being sent from a specific domain (or sender domains) to each tenant (or a destination domain). Accordingly, a campaign may be identified where there is a burst of emails to tenants of the user, where the email is sent from a rare sender and/or during a short time period. That is, the anomaly detection component 116 may retrospectively identify campaigns associated with a particular time period (e.g., such as the past 180 days) using the sender domain and data associated with the subject of the emails. Accordingly, by not requiring use of ML models and/or the body of the emails, the anomaly detection component 116 requires fewer network and/or device resources and provides a streamlined way to retrospectively identify campaigns.

The threat defense system 114 may include a categorization component 118. In some examples, the categorization component 118 may extract the subject of each email identified as being part of the email campaign. In some examples, the categorization component 118 may receive anomaly data as input. In some examples, the anomaly data comprises an indication of a subject of the record data associated with a campaign.

In some examples, the categorization component 118 may compare data associated with each subject of an email in the email campaign with a pre-computed dictionary of words in order to determine a category associated with the email campaign. In some examples, the category may comprise labeling the email campaign as BEC (e.g., sub-categories include payroll, initial lure, gift card, invoice, aging report, tax statement, wire transfer), Phishing, SPAM, SCAM (e.g., sub-categories include advance fee, extortion, inheritance, investment, lottery, romance, etc.), and/or marketing campaigns.

For instance, the categorization component 118 may extract data associated with the subjects from each of the emails. The categorization component 118 may compare the subject data with the pre-stored labeled regular expressions. In case of a match, the categorization component 118 may assign a label to the email campaign. For instance, the email campaign may get assigned a label such as BEC, Phishing, marketing, SCAM, and/or SPAM emails. In some examples, the pre-stored regular expressions may be computed by combining the words extracted from the subject using NLTK and/or document modeling techniques against a set of BEC, Phishing, marketing, and SPAM emails.

In some examples, the categorization component 118 may utilize statistical models to determine whether there is a match between a subject and a pre-stored label. For instance, the categorization component 118 may apply fuzzy hashing to the subjects of emails in the subset of email(s) (e.g., email(s) from the last 90 days, 180 days, etc.) associated with a particular tenant in order to identify email(s) that share identical subjects and/or are from the same sender address and/or sender domain. In some examples, the categorization component 118 may input the subject of an email into a statistical model and the statistical model may output a topic and key words (e.g., fax, delivery, invoice, call for action, and/or other context key words) based on the subject.

As an example, consider the following regular expression:
"/\nSubject:[^\n]{1,30} (available|fast[^\n]{1,3} one|hello|respond|incentive|essential|response |required|need|moment\b|urgent|asap|task|gift| card|plan\b|surprise|payment/\bquick/\bi mmediate/\bassist\b|emergency|are[^\n]{1,3} you)/ ascii wide nocase"

In this example, the categorization component 118 may compare the above expression to the pre-stored labeled regular expressions to determine whether there is a match. For instance, the categorization component 118 may determine that the subject contains word(s) associated with and/or used in BEC campaigns (e.g., sub-categories include payroll, initial lure, gift card, invoice, aging report, tax statement, wire transfer). In this example, categorization component 118 may label the email campaign as a BEC campaign. In some examples, the categorization component 118 may output categorization data (e.g., such as the subject data, label, key word(s), topic(s), etc.) to the verdict correlation component.

In some examples, the threat defense system 114 may include a feature extraction component 120. In some examples, the feature extraction component 120 may be configured to access one or more public database(s), public site(s), and/or public libraries. In some examples, the feature extraction component 120 may receive the record data, the categorization data from the categorization component and/or the anomaly data from the anomaly detection component as input.

In some examples, the feature extraction component 120 may extract a sender domain, a certificate, and/or any URLs found within the emails associated with the record data. In some examples, the feature extraction component 120 may access a public URL domain registration database (e.g., such as WHOIS) in order to determine whether a sender domain is suspicious (e.g., potentially malicious). In some examples, the feature extraction component 120 may input a sender domain into WHOIS and receive WHOIS record data in return. In some examples, the WHOIS record data may comprise a creation time associated with a sender domain, an expiration date associated with the sender domain, an indication of whether the sender domain is registered or not, whether information is missing in the WHOIS registration record, existence of privacy protection services, administrator country information, etc.

In some examples, the feature extraction component 120 may utilize the WHOIS record of a sender domain to determine whether a URL is suspicious. Conditions that are used to determine a URL associated with a sender domain is suspicious may include, but are not limited to: (1) a creation time in less than six months; (2) no WHOIS or name server; (3) WHOIS domain is going to expire in less than a year; (4) the existence of missing information in the WHOIS record; (5) the existence of suspicious information in the WHOIS record (e.g., the administrator country, etc.); and/or (6) the existence of privacy protection services.

In some examples, the feature extraction component 120 may extract a certificate of a URL and/or a certificate of a domain in order to determine if the URL and/or the domain is suspicious. For example, the certificate of the URL may correspond to the SSL. Suspicious conditions may include, but are not limited to: (1) a server does not support hypertext transfer protocol (HTTP); (2) a HOST name does not match the certificate; (3) the certificate is expired; (4) the expiry time of the certificate is in less than six months; and/or (5) the certificate is signed by a certificate authority mainly used in malicious domains (e.g., cPanel, Let's Encrypt, etc.). In some examples, the feature extraction component 120 is configured to input the URL into a URL tester website. In this example, the URL tester may output an indication of whether the URL is suspicious (e.g., malicious, phishing, etc.).

In some examples, the feature extraction component 120 may be configured to consult with domain ranking systems, such as, for example, Alexa rank (or any other global ranking system that ranks websites in order of popularity) to determine if the domain name of any URLs found in the emails of a campaign are among the top "X" number of domains (e.g., top 1 million domains or any suitable number).

The threat defense system 114 may include a verdict correlation component 122. In some examples, the verdict correlation component 122 may correspond to a verdict correlation engine. In some examples, the verdict correlation component 122 may receive input from one or more of the anomaly detection component, categorization component, and/or feature extraction component. In some examples, the verdict correlation component 122 may provide output(s) to one or more of the anomaly detection component, the categorization component, feature extraction component, and/or remediation component. For example, the verdict correlation component 122 may receive data as input from the anomaly detection component, the data comprising an email address of a sender and a sender domain for each email accessed by the anomaly detection component. In this example, the verdict correlation component 122 may determine whether the sender is a rare sender (e.g., a sender email address that has not contacted a tenant previously or very rarely contacts the tenant) and/or whether the sender domain is a rare domain (e.g., a sender domain that has not contacted a tenant previously or very rarely contacts the tenant), by correlating the data with additional data corresponding to every sender's email address and every sender domain for a particular tenant for the past 90 days (or any other suitable time period). In some examples, the verdict correlation component 122 may output an indication to the anomaly detection component, where the indication identifies whether the sender's email address is a rare email address and/or or the sender domain is a rare domain for the tenant. As described above, the anomaly detection component may utilize this indication when identifying a campaign.

In some examples, the verdict correlation engine may store and/or utilize input received from the anomaly detection component, categorization component, and/or feature extraction component as rules. In some examples, the verdict correlation component may store pre-set rules. For example, the verdict correlation component 122 may receive features (e.g., categorization data, classification data, and/or any other data and/or metadata described herein) as input and, based on the rules, determine whether the email campaign is malicious or not. In some examples, the output is sent to the remediation component.

In some examples, the verdict correlation component 122 may utilize one or more machine learning model(s), decision trees and/or any other deep learning architecture in order to determine whether a campaign is malicious. For example, the verdict correlation component 122 may receive features (e.g., categorization data, classification data, and/or any other data and/or metadata described herein) as input and, utilizing the ML model(s), output an indication of whether the email campaign is malicious or not. In some examples, the output is sent to the remediation component 124.

The threat defense system 114 may include a remediation component 124. In some examples, the remediation component 124 may be configured to perform one or more remedial actions on a campaign. In some examples, the one or more remedial actions may comprise pulling one or more emails associated with a campaign from inboxes of tenant(s), providing an alert to an administrator of a user (e.g., organization), causing an email associated with a campaign to be highlighted in the mailbox of a tenant, performing no action, etc. In some examples, the remediation component 124 may perform the remedial actions automatically and without administrator input. In some examples, the remediation component 124 may be configured to alert an administrator and perform the remedial action(s) in response to a selection and/or administrator input.

In some examples, the remediation component 124 may determine the remedial action based on the category of the email campaign (e.g., label assigned to the email campaign by the categorization component). For instance, where a campaign is labeled Phishing (e.g., the emails in the email campaign comprise a phishing link) and the threat defense system has determined the email campaign is malicious, the remediation component 124 may be configured to pull (e.g., remove) all emails associated with the email campaign from the inboxes of tenants of the user. For instance, the remediation component may pull the emails from the email database(s) 110.

In some examples, the remediation component 124 may perform a remedial action based on maintaining an allow list and/or a block list. In this example, a user may input a list of sender domains that tenants are permitted to receive emails from on an allow list. The user may also input a list of sender domains that the tenants are not permitted to receive emails from. In this example, where the remediation component 124 determines a sender domain is malicious and is not included on the allow list, the remediation component 124 may update the block list to include the newly identified sender domain. In some examples, the remediation component 124 may be configured to contact additional features of the network system. For instance, the remediation component may be configured to send any indications of Phishing campaigns, BEC campaigns, and/or any malicious campaign to a network extended detection response (e.g., such as Cisco XDR) in order to improve network security.

The threat defense system 114 may further include a data store 216, such as long-term storage, that stores communication libraries 218 for the different communication protocols that the threat defense system 114 is configured to use or perform. Additionally, the data store 216 may include network topology data 220, such as a model representing the layout of the network components in the network 102 and/or data indicating available bandwidth, available CPU, delay between nodes, computing capacity, processor architecture, processor type(s), etc., The data store 216 may store policies 222 that includes security data associated with the network, security policies configured for the network, firewall policies, firewall configuration data, compliance policies configured for the network, policies associated with the control policy sequence(s), etc. The data store 216 may store data 224 that includes metadata associated with emails, record data, tenant data, anomaly data, correlation data, algorithms, any other data described herein, etc.

Figure 3A:
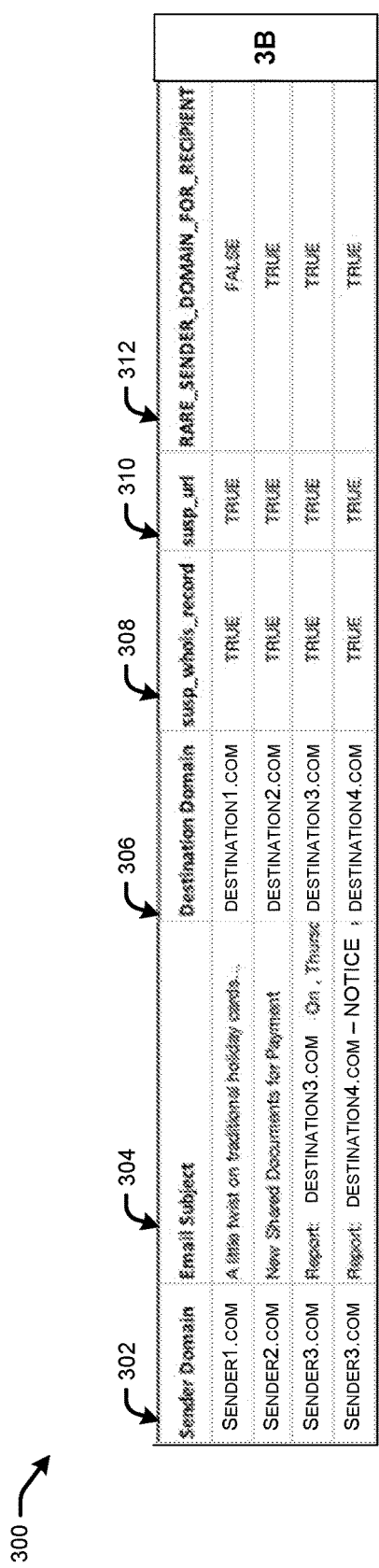
FIGS. 3A and 3B collectively illustrate an example listing of campaigns detected using the techniques described herein.
Figure 3B:
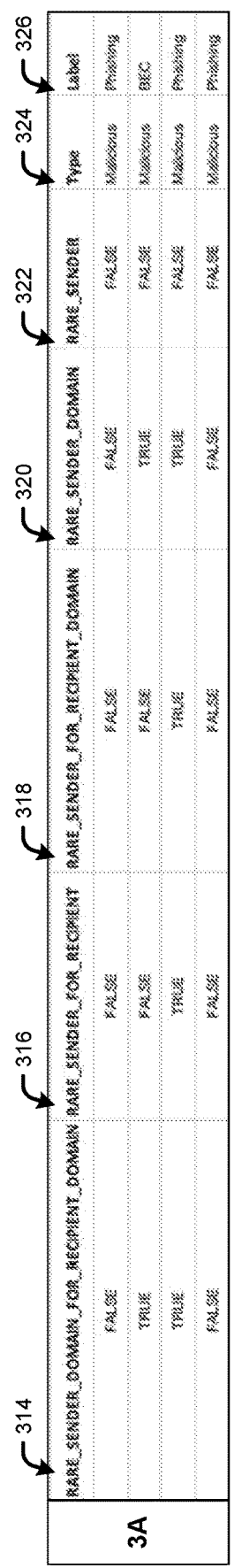

FIGS. 3A and 3B illustrates an example listing of campaigns 300 that may be detected by the system described in FIGS. 1-2. In some examples, the example listing of campaigns 300 may be visualized by stitching the portion of the example listing represented by FIG. 3B onto the right side of the portion of the example listing represented by FIG. 3A.

In some examples, the example listing of campaigns 300 may include one or more rows representing individual campaigns detected and/or one or more columns representing various information fields associated with the entries, such as, for example, a sender domain field 302, an email subject field 304, a destination domain field 306, a susp_whois_record (e.g., suspicious WHOIS record Boolean) field 308, a susp_url (e.g., suspicious URL Boolean) field 310, a RARE_SENDER_DOMAIN_FOR_RECIPIENT field 312, a RARE_SENDER_DOMAIN_FOR_RECIPIENT_DOMAIN field 314, a RARE_SENDER_FOR_RECIPIENT field 316, a RARE_SENDER_FOR_RECIPIENT_DOMAIN field 318, a RARE_SENDER_DOMAIN field 320, a RARE_SENDER field 322, a Type field 324 (e.g., indicating whether the given campaign entry is malicious), and/or a label field 326 (e.g., indicating the type of campaign associated with the given listing). In some examples, any number of the fields may include a Boolean indicator.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

Figure 4:
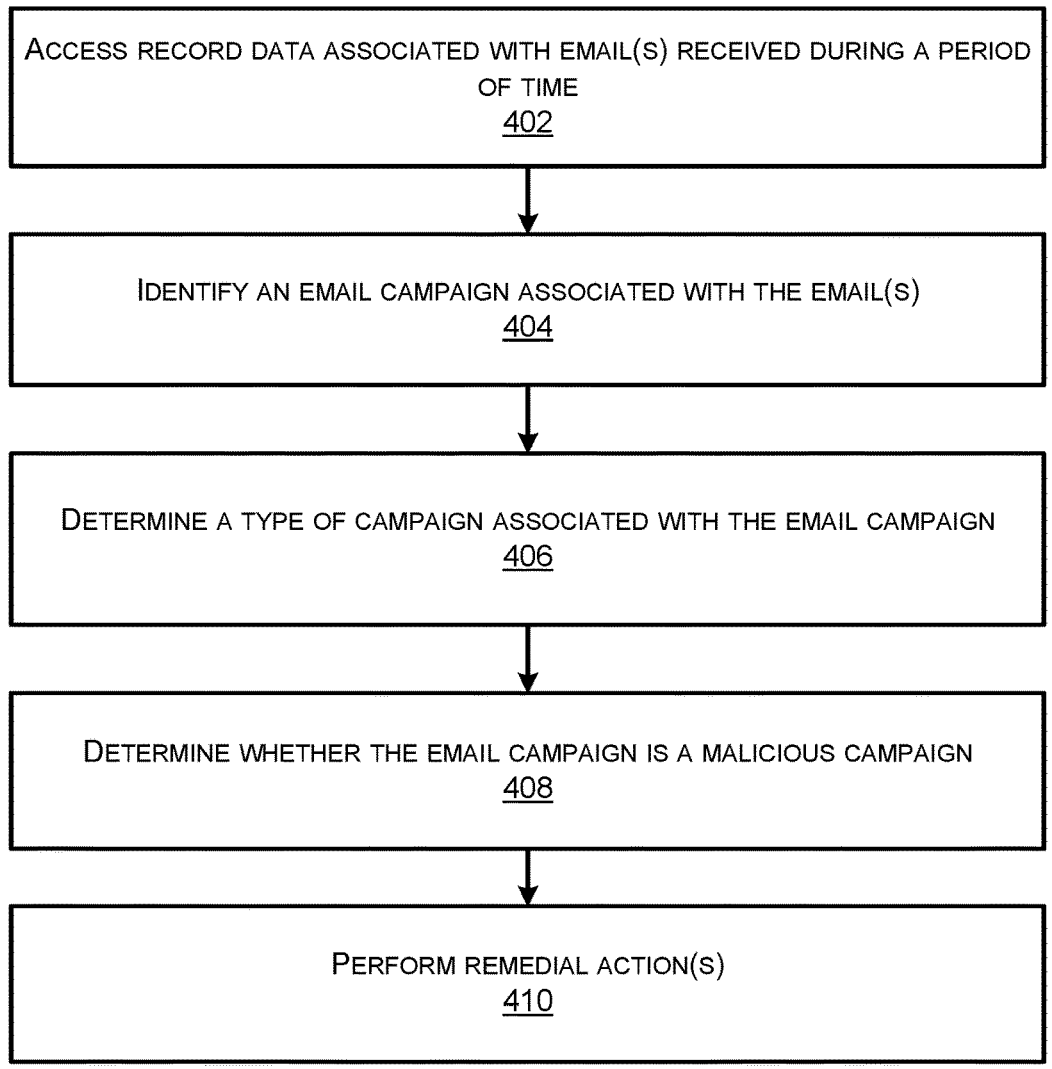
FIG. 4 illustrates a flow diagram of an example method for retroactively identifying, classifying, categorizing, and/or remediating campaigns by the system described in FIGS. 1-3.

FIG. 4 illustrates a flow diagram of an example system 400 for retroactively identifying, classifying, categorizing, and/or remediating campaigns. In some instances, the steps of system 400 may be performed by one or more devices (e.g., threat defense system 114, network device(s) 104, etc.) that include one or more processors and one or more non-transitory computer-readable media storing computer-executable instructions that, when executed by the one or more processors, cause the one or more processors to perform operations of system 400.

At 402, the system may access record data associated with email(s) received during a period of time. In some examples, the system may connect to a database associated with the network. In some examples, the database corresponds to an email server associated with the network. For instance, the system may initiate a connection via a network to an email database associated with a user (e.g., organization, school, etc.). In some examples, the email database may store email data and record data associated with emails of tenants (e.g., employees of the user, etc.) of the user. In some examples, the period of time may correspond to a retrospective period of time (e.g., such as past 60 days, past 90 days, past 180 days, etc.).

In some examples, the record data may comprise data associated with the emails (e.g., such as data corresponding to the body of the emails). In some examples, the record data may comprise metadata associated with the email, including metadata associated with URLs in an email, attachments (e.g., PDFs, GIFs, etc.) associated with the email, metadata associated with the subject of the email, metadata corresponding to the "FROM" email header, metadata corresponding to the "TO" email header, metadata comprising a timestamp associated with the email, and/or any other metadata associated with the email.

At 406, the system may identify an email campaign associated with the emails. In some examples, identifying the email campaign is based at least in part on inputting the record data into an algorithm, the algorithm comprising a time-series anomaly detection algorithm. For instance, the system may identify an email campaign by performing a time-series analysis on metadata associated with the emails. In some examples, the metadata may comprise the subject, the sender domain, sender email address, timestamp, etc. In some examples, the email campaign may correspond to a subset of the emails retrieved. In some examples, the system may identify the email campaign using the anomaly detection component described herein.

At 408, the system may determine a type of campaign associated with the email campaign. In some examples, the system may extract subject data from the emails during the period of time, determine whether the subject data match one or more prestored labeled regular expressions, and based at least in part on identifying a match between the subject data and a pre-stored labeled regular expression, label the email campaign. In some examples, the subject data may correspond to the metadata associated with the subject of an email. In some examples, the pre-stored labeled regular expressions may correspond to regular expressions used by malicious actors. In some examples, the one or more pre-stored regular expressions may be generated using a topic modeling NLP algorithm.

In some examples, labeling the email campaign may comprise assigning a label to the email campaign, the label comprising one of a BEC campaign (e.g., sub-categories include payroll, initial lure, gift card, invoice, aging report, tax statement, wire transfer), a phishing campaign, a SPAM campaign, a SCAM campaign (e.g., sub-categories include advance fee, extortion, inheritance, investment, lottery, romance, etc.), a benign campaign, and/or a marketing campaign. In some examples, the system may determine the type of campaign using the categorization component described herein.

At 410, the system may determine whether the email campaign is a malicious campaign. In some examples, determining whether the email campaign is malicious comprises extracting sender email addresses and domains associated with each email in the email campaign. In this example, the system may determining, based at least in part on the sender email addresses and the domains, whether a sender email address or a domain corresponds to a rare email address or a rare domain over the period of time, and based at least in part on the sender email address to the domain corresponding to the rare email address or the rare domain, determining the email campaign is the malicious campaign.

In some examples, the system may determine whether the email campaign is malicious based on one or more features. In some examples, the one or more features may correspond to features associated with the sender domain, sender email address, etc. In some examples, the system may determine whether an email campaign is malicious using the feature extraction component and/or the verdict correlation component described herein.

At 412, the system may perform remedial action(s). In some examples, the remedial action(s) may comprise pulling one or more emails associated with the malicious campaign from one or more mailboxes of one or more users, providing an alert to one or more users associated with the malicious campaign, causing an email associated with the malicious campaign to be highlighted in the one or more mailboxes of the one or more users, or sending a notification to an administrator identifying the malicious campaign. In some examples, the system may perform the remedial action(s) using the remediation component described herein.

Figure 5:
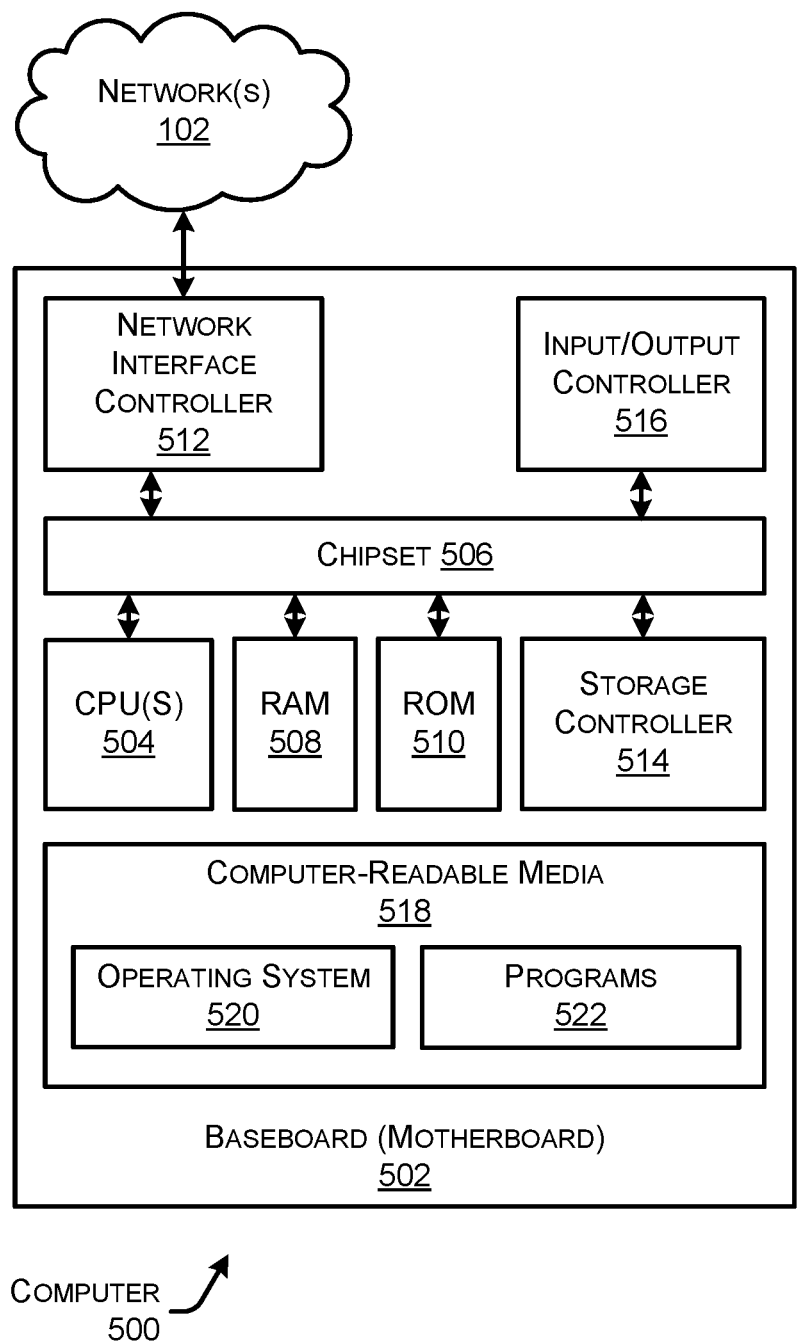
FIG. 5 is a computer architecture diagram showing an illustrative computer hardware architecture for implementing a device that can be utilized to implement aspects of the various technologies presented herein.

FIG. 5 shows an example computer architecture for a device capable of executing program components for implementing the functionality described above. The computer architecture shown in FIG. 5 illustrates any type of computer 500, such as a conventional server computer, workstation, desktop computer, laptop, tablet, network appliance, e-reader, smartphone, or other computing device, and can be utilized to execute any of the software components presented herein. The computer may, in some examples, correspond to a threat defense system 114 and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network, such as network 102. The chipset 506 can include functionality for providing network connectivity through a NIC 512, such as a gigabit Ethernet adapter. The NIC 512 is capable of connecting the computer 500 to other computing devices over the network 102. It should be appreciated that multiple NICs 512 can be present in the computer 500, connecting the computer to other types of networks and remote computer systems.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program components, data structures, or other data. It should be appreciated by those skilled in the art that computer-readable storage media is any available media that provides for the non-transitory storage of data and that can be accessed by the computer 500. In some examples, the operations performed by the threat defense system 114 and/or any components included therein, may be supported by one or more devices similar to computer 500. Stated otherwise, some or all of the operations performed by the threat defense system 114 and/or any components included therein, may be performed by computer 500 and/or one or more computer devices.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computer 500.

In one embodiment, the storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes described above with regard to FIGS. 1-4. The computer 500 can also include computer-readable storage media having instructions stored thereupon for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

As described herein, the computer 500 may comprise one or more of a threat defense system 114 and/or any other device. The computer 500 may include one or more hardware processors (processor(s)) configured to execute one or more stored instructions. The processor(s) (e.g., CPUs 504) may comprise one or more cores. Further, the computer 500 may include one or more network interfaces configured to provide communications between the computer 500 and other devices, such as the communications described herein as being performed by the threat defense system 114 and/or any other device. The network interfaces may include devices configured to couple to personal area networks (PANs), wired and wireless local area networks (LANs), wired and wireless wide area networks (WANs), SDWANs, and so forth. For example, the network interfaces may include devices compatible with Ethernet, Wi-Fi™, and so forth.

The programs 522 may comprise any type of programs or processes to perform the techniques described in this disclosure. For instance, the programs 522 may cause the computer 500 to perform techniques including accessing, based at least in part on connecting to a database associated with the network, record data associated with emails received during a period of time; identifying, based at least in part on the record data, a campaign associated with the emails; determining a type of campaign associated with the email campaign; determining, based at least in part on extracting metadata associated with the emails, that the email campaign is a malicious campaign; and performing, based at least in part on the type of campaign, one or more remedial actions.

In this way, the computer 500 can retroactively identify campaigns that have bypassed existing threat detection mechanism, thereby remediating false negatives and improving network security. Moreover, by focusing on emails that have bypassed existing detection mechanisms, the described techniques utilize data associated with a subset of emails, thereby using less resources than existing mechanisms and improving overall function of the network. Further, by utilizing a time-series analysis (e.g., versus fuzzy hashing and/or ML models) and the subjects of emails (e.g., versus the bodies of the email, etc.), the described techniques require less storage and/or computing resources than existing mechanisms, thereby improving network device functioning, and providing a system that is scalable for a large network.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method implemented by a network device of a network to perform retrospective campaign detection, the method comprising:
   accessing, based at least in part on connecting to a database associated with the network, record data associated with emails sent to recipient email addresses during a period of time, the record data including (i) timestamp data associated with respective times at which the emails were sent and (ii) sender email addresses from which the emails were sent;
   obtaining historical data indicating historical amounts of emails communicated between the recipient email addresses and from the sender email addresses during a historical period of time;
   determining, using the timestamp data and the historical data, that a number of the emails sent during the period of time is anomalous relative to the historical amounts of emails sent during the historical period of time;
   identifying, based at least in part on the number of the emails sent anomalous as compared to the historical amounts of emails, a campaign associated with the emails;
   determining a type of campaign associated with the email campaign;
   determining, based at least in part on extracting metadata associated with the emails, that the email campaign is a malicious campaign; and
   performing, based at least in part on the type of campaign, one or more remedial actions.

2. The method of claim 1, wherein the record data comprises URLs in the emails, a subject of the email, header data associated with the emails, a timestamp associated with the emails, and a date when the emails were sent.

3. The method of claim 1, wherein identifying the email campaign is based at least in part on inputting the record data into an algorithm, the algorithm comprising a time-series anomaly detection algorithm.

4. The method of claim 1, wherein the database corresponds to an email server associated with the network.

5. The method of claim 1, wherein determining whether the email campaign is the malicious campaign comprises:
   extracting sender email addresses and domains associated with each email in the email campaign;
   determining, based at least in part on the sender email addresses and the domains, whether a sender email address or a domain corresponds to a rare email address or a rare domain over the period of time; and
   based at least in part on the sender email address to the domain corresponding to the rare email address or the rare domain, determining the email campaign is the malicious campaign.

6. The method of claim 1, wherein determining the type of campaign comprises:
   extracting subject data from the emails during the period of time;
   determining whether the subject data match one or more pre-stored labeled regular expressions; and
   based at least in part on identifying a match between the subject data and a pre-stored labeled regular expression, labeling the email campaign.

7. The method of claim 6, wherein labeling the email campaign comprises assigning a label of at least one of a BEC campaign, a Phishing campaign, a marketing campaign, a SCAM campaign, or a SPAM campaign.

8. The method of claim 6, wherein the one or more pre-stored labeled regular expressions correspond to regular expressions used by malicious actors, the one or more pre-stored labeled regular expressions being generated using a topic modeling NLP algorithm.

9. The method of claim 1, wherein the one or more remedial actions comprise pulling one or more emails associated with the malicious campaign from one or more mailboxes of one or more users, providing an alert to one or more users associated with the malicious campaign, causing an email associated with the malicious campaign to be highlighted in the one or more mailboxes of the one or more users, or sending a notification to an administrator identifying the malicious campaign.

10. A system to perform retrospective campaign detection within a network, the system comprising:
    one or more processors; and
    one or more non-transitory computer-readable media storing computer-executable instructions that, when executed by the one or more processors, cause the one or more processors to perform operations comprising:
    accessing, based at least in part on connecting to a database associated with the network, record data associated with emails sent to recipient email addresses during a period of time, the record data including (i) timestamp data associated with respective times at which the emails were sent and (ii) sender email addresses from which the emails were sent;
    obtaining historical data indicating historical amounts of emails communicated between the recipient email addresses and from the sender email addresses during a historical period of time;
    determining, using the timestamp data and the historical data, that a number of the emails sent during the period of time is anomalous relative to the historical amounts of emails sent during the historical period of time;
    identifying, based at least in part on the number of the emails sent anomalous as compared to the historical amounts of emails, a campaign associated with the emails;
    determining a type of campaign associated with the email campaign;
    determining, based at least in part on extracting metadata associated with the emails, that the email campaign is a malicious campaign; and
    performing, based at least in part on the type of campaign, one or more remedial actions.

11. The system of claim 10, wherein the record data comprises URLs in the emails, a subject of the email, header data associated with the emails, a timestamp associated with the emails, and a date when the emails were sent.

12. The system of claim 10, wherein identifying the email campaign is based at least in part on inputting the record data into an algorithm, the algorithm comprising a time-series anomaly detection algorithm.

13. The system of claim 10, wherein the database corresponds to an email server associated with the network.

14. The system of claim 10, wherein determining whether the email campaign is the malicious campaign comprises:
    extracting sender email addresses and domains associated with each email in the email campaign;
    determining, based at least in part on the sender email addresses and the domains, whether a sender email address or a domain corresponds to a rare email address or a rare domain over the period of time; and based at least in part on the sender email address to the domain corresponding to the rare email address or the rare domain, determining the email campaign is the malicious campaign.

15. The system of claim 10, wherein determining the type of campaign comprises:
extracting subject data from the emails during the period of time;
determining whether the subject data match one or more pre-stored labeled regular expressions; and
based at least in part on identifying a match between the subject data and a pre-stored labeled regular expression, labeling the email campaign.

16. The system of claim 15, wherein labelling the email campaign comprises assigning a label of at least one of a BEC campaign, a Phishing campaign, a Marketing campaign, a SCAM campaign, or a SPAM campaign.

17. The system of claim 15, wherein the one or more pre-stored labeled regular expressions correspond to regular expressions used by malicious actors, the one or more pre-stored labeled regular expressions being generated using a topic modeling NLP algorithm.

18. The system of claim 10, wherein the one or more remedial actions comprise pulling one or more emails associated with the malicious campaign from one or more mailboxes of one or more users, providing an alert to one or more users associated with the malicious campaign, causing an email associated with the malicious campaign to be highlighted in the one or more mailboxes of the one or more users, or sending a notification to an administrator identifying the malicious campaign.

19. At least one non-transitory computer-readable storage medium having stored therein instructions which, when executed by one or more processors, cause the one or more processors to:
access, based at least in part on connecting to a database associated with a network, record data associated with emails sent to recipient email addresses during a period of time, the record data including (i) timestamp data associated with respective times at which the emails were sent and (ii) sender email addresses from which the emails were sent;
obtain historical data indicating historical amounts of emails communicated between the recipient email addresses and from the sender email addresses during a historical period of time;
determine, using the timestamp data and the historical data, that a number of the emails sent during the period of time is anomalous relative to the historical amounts of emails sent during the historical period of time;
identify, based at least in part on the number of the emails sent anomalous as compared to the historical amounts of emails, a campaign associated with the emails;
determine a type of campaign associated with the email campaign;
determine, based at least in part on extracting metadata associated with the emails, that the email campaign is a malicious campaign; and
perform, based at least in part on the type of campaign, one or more remedial actions.

20. The at least one non-transitory computer-readable storage medium of claim 19, wherein the one or more remedial actions comprise pulling one or more emails associated with the malicious campaign from one or more mailboxes of one or more users, providing an alert to one or more users associated with the malicious campaign, causing an email associated with the malicious campaign to be highlighted in the one or more mailboxes of the one or more users, or sending a notification to an administrator identifying the malicious campaign.

* * * * *